G. L. JACQUES.
SHOCK ABSORBER.
APPLICATION FILED APR. 16, 1919.

1,319,086.

Patented Oct. 21, 1919.
2 SHEETS—SHEET 1.

WITNESSES
R. E. Rousseau

INVENTOR
G. L. JACQUES
BY
ATTORNEYS

G. L. JACQUES.
SHOCK ABSORBER.
APPLICATION FILED APR. 16, 1919.
1,319,086.
Patented Oct. 21, 1919.
2 SHEETS—SHEET 2.
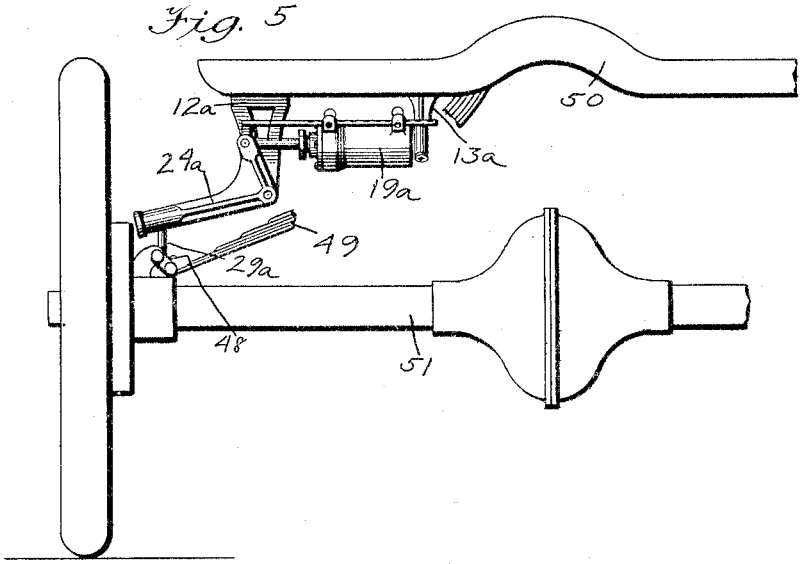
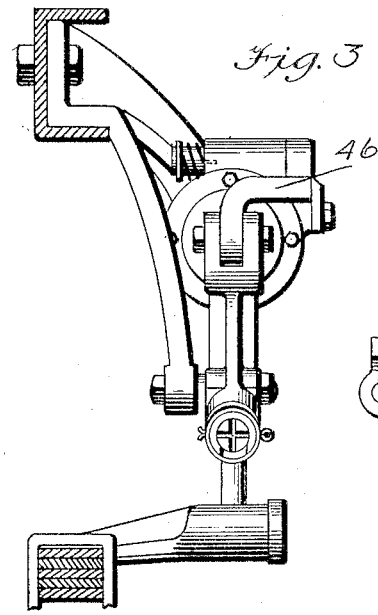
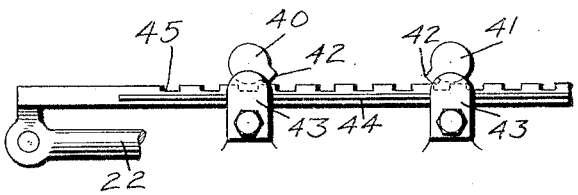
WITNESSES
INVENTOR
G. L. JACQUES
ATTORNEYS

UNITED STATES PATENT OFFICE.

GEORGE L. JACQUES, OF NEILLSVILLE, WISCONSIN.

SHOCK-ABSORBER.

1,319,086.   Specification of Letters Patent.   Patented Oct. 21, 1919.

Application filed April 16, 1919. Serial No. 290,429.

*To all whom it may concern:*

Be it known that I, GEORGE L. JACQUES, a citizen of the United States, and a resident of Neillsville, in the county of Clark and State of Wisconsin, have invented certain new and useful Improvements in Shock-Absorbers, of which the following is a specification.

My present invention relates generally to shock absorbers for cushioning the relative movement in opposite directions between the relatively movable bodies and is particularly directed toward shock absorbers for vehicles, my object being the provision of a connection between the running gear and body of vehicles, whereby to absorb the shock of their relative movement and of such nature as to interpose an air cushion of gradually increasing pressure as the movement continues.

The primary object of my invention is therefore, the provision of a shock absorber which includes a piston movable within and toward the opposite end of an air cylinder, together with means controlled by the piston, whereby to cut off and establish atmospheric communication respectively at the front of and in the rear, of the piston in its movement toward either end of the cylinder.

A further object of the invention is the provision of a cylinder so mounted as to accommodate itself readily to the movements of the piston and its rod, in view of the particular connections as hereinafter described between the rod and one of the relatively movable bodies.

A still further object of the invention is the provision of an arrangement of this sort including connections with one of the relatively movable bodies of such nature as to permit of lateral and longitudinal shifting movement of the bodies with respect to one another, and without affecting the shock absorber.

These general objects, as well as other and more specific objects, and the advantages of my present invention, will be better understood from the following description thereof, reference being made to the accompanying drawings, forming a part of this specification, and wherein:—

Figure 1:
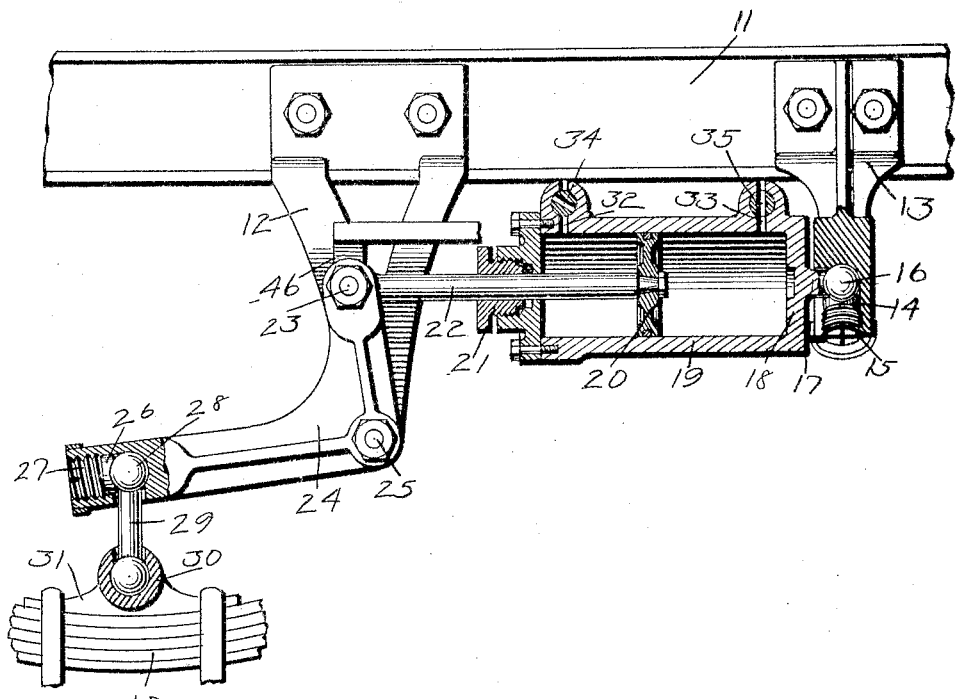
Figure 2:
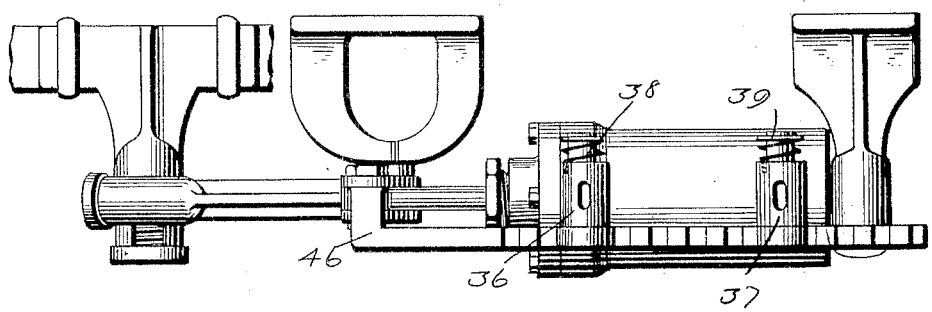

Figure 1 is an enlarged side view partly broken away and in section, illustrating my improvement connected in one position between two relatively movable bodies, Fig. 2 is a top plan view of my invention as seen in Fig. 1, Fig. 3 is a vertical cross section taken therethrough, Fig. 4 is a side view showing the valve controlling arrangement, and Fig. 5 is a partial rear elevation illustrating my invention as applied in a slightly different position relative to the movable bodies, as compared to Figs. 1 to 4.

Referring now to these figures, my invention proposes a shock absorber in connection with relatively movable bodies, for instance the body and running gear of a vehicle, a portion of the running gear of which is indicated at 10 in Fig. 1, and a portion of the body at 11. More specifically, the part 10 is a portion of one of the ordinary vehicle springs clamped to the running gear and the part 11 is one of the longitudinal side frame members of the body, to the latter of which I secure depending brackets 12 and 13 at longitudinally spaced points.

The bracket 13 has a socket 14 at its lower end, the lower portion of which is closed by a threaded grease-holding plug 15, and the socket of which is occupied by a spherical or ball-like end 16 of a projection 17 extending axially from one closed end 18 of a piston cylinder 19, within which a piston 20 is movable toward the opposite end. The other end of the cylinder 19 has a stuffing box 21 for the rod 22, connected at its inner end to the piston 20 and the outer end of which projects exteriorly through the stuffing box 21 and is pivotally connected at 23 to the upright arm of a bell crank lever 24.

The bell crank lever 24 is fulcrumed at 25 upon the lower end of the bracket 12 and the extremity of its lower generally horizontal arm is provided with a socket 26, the end of which is normally closed by a grease-holding plug 27.

The socket 26 of the lower arm of the bell crank lever 24 receives the upper, spherically enlarged end 28 of a link 29 disposed vertically as seen, and the lower end of which is mounted within the socket extension 30 of a bracket 31, clamped to the running gear of a vehicle and more particularly to the springs 10 as seen clearly in Figs. 1, 2 and 3.

Thus by virtue of the vertical link 29 with its universally movable connection at 26 and 30, with the bell crank lever 24 and the running gear, it is obvious that the running gear and the body of the vehicle are capable of lateral and longitudinal shiftable movement with respect to one another, and without affecting the shock absorber proposed herein.

Adjacent to its relatively opposite ends, the piston cylinder 19 has ports 32 and 33, communication through which to the atmosphere is controlled by horizontally disposed rotating valves 34 and 35 respectively. These valves are mounted within valve casings 36 and 37, as best seen in Fig. 2, beyond opposite ends of which the valve stems project, and springs 38 and 39 engage the valve stems at one exposed end.

Beyond the opposite sides of the casings 36 and 37, the valves 34 and 35 have enlarged heads 40 and 41, as best seen in Fig. 4, each provided with an extending lug 42, located adjacent to guide members 43, secured to the cylinder 19 and through which guides 43 a valve controlling arm 44 extends. This valve controlling arm has in its upper surface a longitudinal series of notches 45 in each of which the lugs 42 are engageable, and the arm 44 is rigidly connected at one end to the outer end of the piston rod 22, by virtue of an offset extension 46, as best seen in Figs. 2 and 3.

In originally setting the arrangement, both of the heads 40 and 41 are turned with their lugs 42 toward one another, upon the upper notched surface of the controlling arm 44, thus placing their springs 38 and 39 under tension so as to continuously urge the lugs 42 downwardly toward the notches 45 of the said controlling arm. With the parts as seen in Fig. 4, both of the valves 34 and 35 are open, the piston 20 being then at an exactly central position within the cylinder 19 and it is obvious that when the piston starts moving toward either end of the cylinder, one of the valve heads 40 or 41 will be rotated by virtue of the engagement of the lug 42 in one of the notches 45 of the valve controlling arm 44, the said valve controlling arm simply slipping beneath the lug 42 of the other head, so that one head will remain open, while the other head is rotated so as to close its respective valve, this valve being the one in advance of the piston with respect to its particular direction of movement at that time.

It is furthermore obvious that upon relative movement of the two relatively movable bodies, that is, in either direction, corresponding movement will be imparted to the piston 20 and the resistance within the cylinder 19 to the movement of this piston, will constitute the means of absorbing all shocks of such movement between the relatively movable bodies, and it is furthermore obvious that by virtue of the closing of communication between the interior of the piston cylinder and the atmosphere in advance of the piston in either direction, and simultaneously maintaining free communication between the interior of the cylinder and the atmosphere in the rear of the piston, a gradually increasing pressure will be created in advance of the piston as the relative movement continues in the same direction, so as to interpose a cushion of gradually increasing effectiveness, which becomes immediately available upon movement of the piston in either direction.

It is to be observed that as to the movement of the piston 20 and its rod 22, subject as they are to the influence of the bell crank lever 24 in its arc of movement around its fulcrum point 25, are compensated for by virtue of the particular mounting of the cylinder 19, which is entirely free at one end, and the other end of which has a universally movable connection with one of the relatively movable bodies, namely, the vehicle body.

In Fig. 5 I have shown the adaptability of my invention to a particular type of motor vehicle, wherein it is necessary to dispose the shock absorbing arrangement transversely with respect to the motor vehicle instead of longitudinally as in Fig. 1. In Fig. 5, the lower universal bearing of the connecting link 29$^a$ is had in the support 48 of one end of the rear transverse body spring, as seen at 49. The bell crank lever 24$^a$ engages the upper end of the link 29$^a$ in the same manner as described in connection with Figs. 1 to 4 inclusive, and the remaining parts are exactly the same, including the valve controlling feature, the cylinder 19$^a$, brackets 12$^a$ and 13$^a$, as those previously described, except that these parts are disposed transversely with respect to the body 50 and running gear 51, instead of longitudinally. It is obvious, however, that disposed either transversely or longitudinally, my invention still presents the advantages heretofore mentioned and operates with equal facility and effectiveness.

I claim:—

1. A shock absorber for yieldably spacing relatively movable bodies, including a piston cylinder carried by one of the said relatively movable bodies and having vents adjacent to its opposite ends, a piston movable therein, and having an exteriorly projecting rod, connections between said piston rod and the other of the said relatively movable bodies, valves controlling the said cylinder vents, and means for closing one and opening the other of said valves operated by movement of the piston in either direction.

2. A shock absorber for yieldably spacing relatively movable bodies, comprising a piston cylinder supported by one of said bodies, a piston movable therein, connections between the piston and the other of the said bodies, and means whereby to cut off and establish communication between the cylinder and the atmosphere, respectively in advance and in the rear of the said piston, operated by movement of the piston in either direction within the cylinder.

3. A shock absorber for yieldably spacing relatively movable bodies, comprising a piston cylinder supported by one of said bodies having atmospheric ports adjacent opposite ends, a piston movable in said cylinder, connections between the piston and the other of said bodies, and reversible valves controlling the said cylinder ports and automatically shiftable by the piston to close one of the ports and open the other, respectively in advance and in the rear of the piston, upon movement of the piston in either direction within the cylinder.

4. A shock absorber for yieldably spacing relatively movable bodies, comprising a piston cylinder carried by one of said bodies and having atmospheric ports adjacent the opposite ends thereof, a piston movable within the cylinder, a piston rod projecting exteriorly of the cylinder from said piston, connections between said piston rod and the other of said bodies, valves controlling the said cylinder port, and having external heads provided with lugs, and a notched rod connected to and actuated by the piston rod and arranged to receive the lugs of the said valve heads in its opposite movements with the piston, for the purpose described.

GEORGE L. JACQUES.

Copies of this patent may be obtained for five cents each, by addressing the "Commissioner of Patents, Washington, D. C."